Aug. 14, 1928.

H. O. BERG

1,680,585

SCREEN DECENTERING DEVICE

Filed June 7, 1927     6 Sheets-Sheet 1

INVENTOR
HART O. BERG
BY
his ATTORNEY.

Aug. 14, 1928.  
H. O. BERG  
SCREEN DECENTERING DEVICE  
Filed June 7, 1927  
6 Sheets-Sheet 3

HART O. BERG  
INVENTOR  
BY  
his ATTORNEY.

Aug. 14, 1928.

H. O. BERG 1,680,585

SCREEN DECENTERING DEVICE

Filed June 7, 1927

HART O. BERG
INVENTOR

BY Otto Munk his ATTORNEY

Aug. 14, 1928.

H. O. BERG 1,680,585

SCREEN DECENTERING DEVICE

Filed June 7, 1927 6 Sheets-Sheet 6

HART O BERG
INVENTOR

BY his ATTORNEY.

Patented Aug. 14, 1928.

1,680,585

UNITED STATES PATENT OFFICE.

HART O. BERG, OF PARIS, FRANCE, ASSIGNOR TO BASSANI PROCESSES, INCORPORATED, OF NEW YORK, N. Y., A CORPORATION OF NEW YORK.

SCREEN-DECENTERING DEVICE.

Application filed June 7, 1927. Serial No. 197,189.

My invention relates to process photographic apparatus and more especially to improvements in an attachment for cameras for the purpose of supporting and displacing a cross-ruled screen in its own plane during exposure.

This invention is a further development of a process and photographic apparatus invented by Laurent Bassani and patented March 2nd, 1926, No. 1,575,408.

Briefly, the purpose of attachments of this character, of which there are several, is to obtain an efficiently operating mechanism for shifting the pencils of light passing through the transparent spaces of the grating, so as to obtain the spreading or enlargement of the portions of the surface of the sensitive plate which are affected by the action of the pencils of light and which constitute the opaque elements of said sensitive plate, this enlargement necessarily being effected to the detriment of the transparent points of the negative, which become smaller, resulting in a reduction of the points appearing in the white spaces of the subject in the transfer upon the metal or upon a lithographic surface.

The introduction of half tone screen adjusting apparatus having for its purpose the shifting motion of the screen during exposure, was accompanied in its first stages of development by more or less complicated mechanism for accomplishing the necessary movements of the screen. Equally intricate were the means utilized to control and set the screen adjusting apparatus. It naturally follows that precision instruments of this character not only represented a very great outlay of time and skilled labor to construct, but in addition called for considerable calculation and skill to set and operate efficiently.

A more recent development and perhaps the most efficient screen adjusting apparatus up to this time is that credited to the said Laurent Bassani who conceived an attachment for process cameras which comprises a cross-ruled screen holder, pantographic means operatively associated with the screen, and an adjustable connection for the free end of the pantographic means, which connection is revolved in a closed path, thereby controlling the pantographic means and adjusting the amplitude of such path with respect to the geometric centers of the transparent elements of the screen grating.

It is acknowledged that the machine briefly described in the foregoing paragraph operates with precision and the results obtained are extremely fine, but as previously stated the elements involved are complicated in both design and arrangement and require considerable calculation to set and operate. With this in mind, it is the purpose of the present invention to provide a screen adjusting apparatus which is extremely accurate in its operations and simple in design and which requires the minimum of skill to operate. I accomplish this purpose by means of the device illustratively exemplified in the accompanying drawings, in which.

Referring to the drawings, 10 denotes the screen box of a process photographic camera, which comprises an upright rectangular member having rigid top and side walls 11 and 12, respectively. A screen frame 13 is suspended at the front of the screen box by means of a pair of overhead grooved castors 14, each thereof being mounted in a bracket 15 attached to the frame 13. The grooved castors 14 are supported on a pair of spindles 16, which according to all modifications of the present invention and those of Bassani's patents are mounted to revolve about centers which correspond to the geometric centers of the transparent elements of the screen 17. The elements described thus far are well known in connection with the patent mentioned and need no further detail description.

Referring now particularly to Figures 1, 2, 3 and 4, two systems of pantographs are illustrated, comprising levers 18 which are assembled on bearings 19 and on the spindles 16, each system of levers being articulated about axis 20 integral with the top wall 11 of the screen box 10. It might be mentioned also that the system of pantographs herein described are identical with those utilized in the Bassani device. The operating mechanism for controlling and causing movement of the upper ends of the systems however constitutes the present invention.

Mounted upon the top wall 11 of the box 10 are a pair of brackets 21, each thereof being adapted to carry one of the systems of pantographs, and for the sake of brevity, but one bracket 21 and its associated parts will be described, since for all practical purposes both are identical in construction and operation. The bracket 21 comprises a base portion set on and secured to the top 11 and an upright column 22 projecting from the rearward portion of the base. Midway the height of the column 22 is arranged a bearing opening 23 having its axis parallel with that of the optical axis of the camera. Mounted in the bearing opening 23 is tubular shaft 24 which projects from opposite sides of the column 22 and carries a worm wheel 25 at the rearward end, the worm 25 being in mesh with a second worm wheel 26 turning with a power shaft 27 disposed entirely across the box 10 in a transverse direction with respect to the axis of the tubular shaft 24. The power shaft 24 is supported in suitable bearings 28 in the columns 22 and at one end joins a motor shaft of an electrically operated motor 29, while the opposite end is provided with a hand wheel 30.

The axis of the bore of the tubular shaft 24 is off center with respect to the axis of the exterior surface thereof so that rotary movement of the shaft causes an eccentric movement of the bore. Disposed to rotate in the bore of the tubular shaft 24 is a solid shaft 31 which is provided with a projecting spindle 32, having its axis offset from the axis of the solid shaft 31 a distance corresponding to the distance between centers of the tubular shaft 24 and its bore, the spindle being adapted to carry and impart movement to the upper ends of levers 18 forming a pantograph system. It will be clear that in order to adjust the relative positions of the axes of the two shafts 24 and 31 with respect to each other, the solid shaft 31 must be rotated within the tubular shaft 24, an operation which is accomplished by means of mechanism comprising a radially projecting gear casing 33 forming an integral part of the tubular shaft 24 between the column 22 and forward end of the shaft. Operating within the casing 33 is a worm 34 in mesh with a worm section 35 cut in the periphery of the solid shaft 31. The stud shaft of the worm 34 has its bearings in the casing 33 and at one end it projects beyond the casing and accommodates one member of a clutch 36, which when engaged and operated is intended to change the relative position of the solid shaft 31 with respect to the tubular shaft 24 and increase or reduce the amplitude of the circular path described by the spindle 32 and pantograph.

Figure 1:
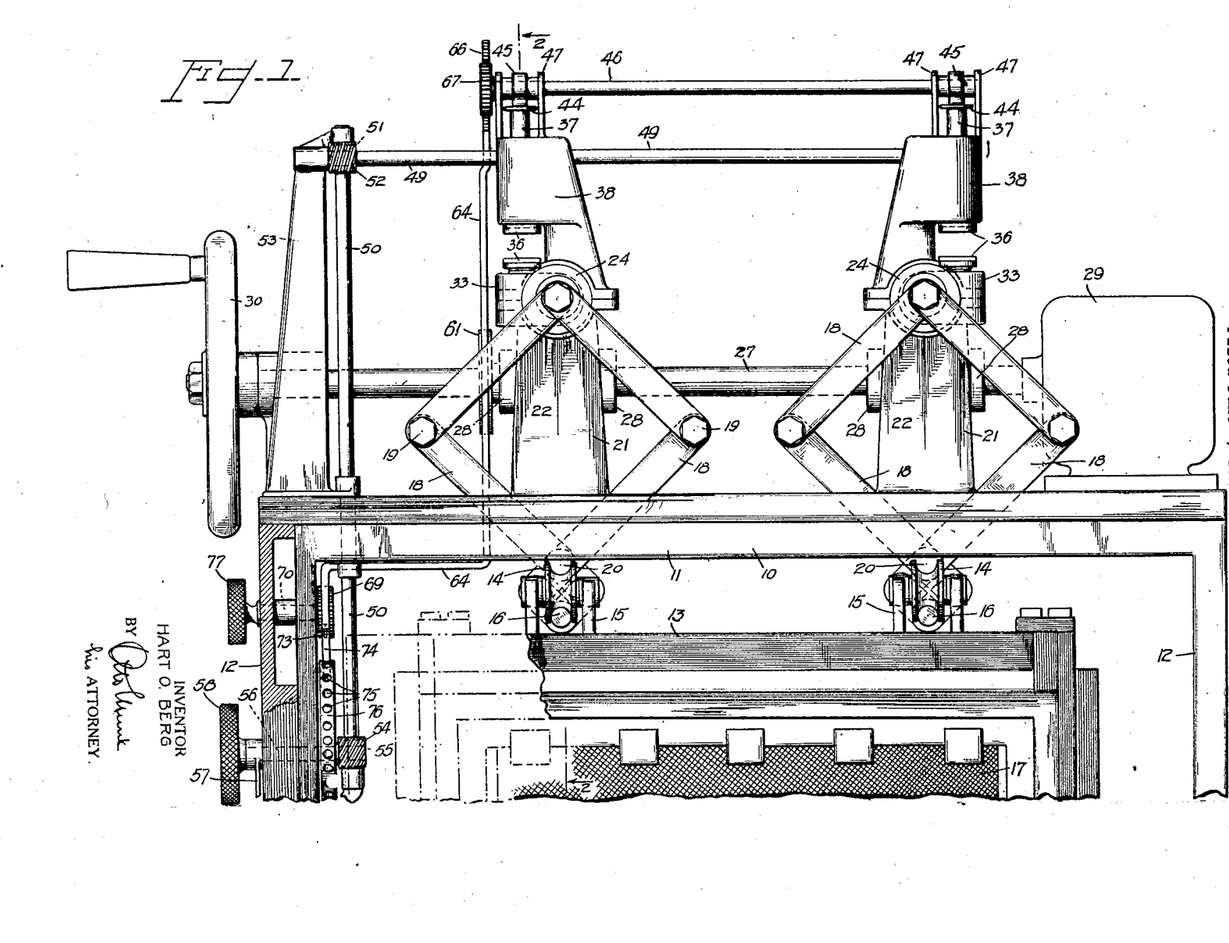
Figure 1 is a front elevational view of a screen box equipped with one embodiment of my invention.

It will be clear that in order to adjust the solid shaft 31, the tubular shaft 24 must be locked against rotation and in a certain position so as to bring the clutch member in an accessible position to be operated. The locking condition is brought about by a mechanism hereinafter described and the clutch member is engaged from overhead by an arrangement comprising a projecting shaft 37 the axis of which is adapted to coincide with the axis of the worm 34 and clutch member when the latter assumes an upright position, as illustrated throughout the drawings. The shaft 37 is mounted in an arm 38 of the column 22, the arm 38 projecting upwardly and forwardly of the bearing for the tubular shaft 24. The free overhanging portion of the arm 28 is provided with a chamber divided into a lower portion 39 and upper portion 40, the lower portion being adapted to enclose a spring 41, which is disposed about the shaft 37, and which bears at one end against a pin 42 of the shaft 37 and at the other end rests against the bottom surface of the chamber. The tendency of the spring 41 is to lift the shaft 37 and normally hold the members of the clutch 36 separated, the other member of the said clutch being attached to the lower end of the shaft 37. In normal position the mid portion of the shaft 37 projects through a worm 43 disposed in the upper portion 39 of the chamber. The worm 43 is slidably connected to the shaft 37 by means of a key and slot arrangement, so that the shaft may be moved longitudinally thereof and still rotate with the turning movement of the worm 43. The upper end of the shaft 37 carries a flat plate 44 which bears up against a cam 45 having a quarter rise which enables the shaft to be depressed by one quarter turn of the cam. The cam 45 is keyed to a cam shaft 46 which bears in upright bearings 47 and extends between both screen adjusting units, as illustrated in Figure 1. Rotary movement is imparted to the shaft 37 through a worm 48, in mesh with worm 43, and mounted on a shaft 49 bearing in the arm 38 and also extending between both screen adjusting units. The purpose of utilizing a single shaft in each case is to make it possible to adjust both units simultaneously and to the same degree.

Figures 2, 3, 4:
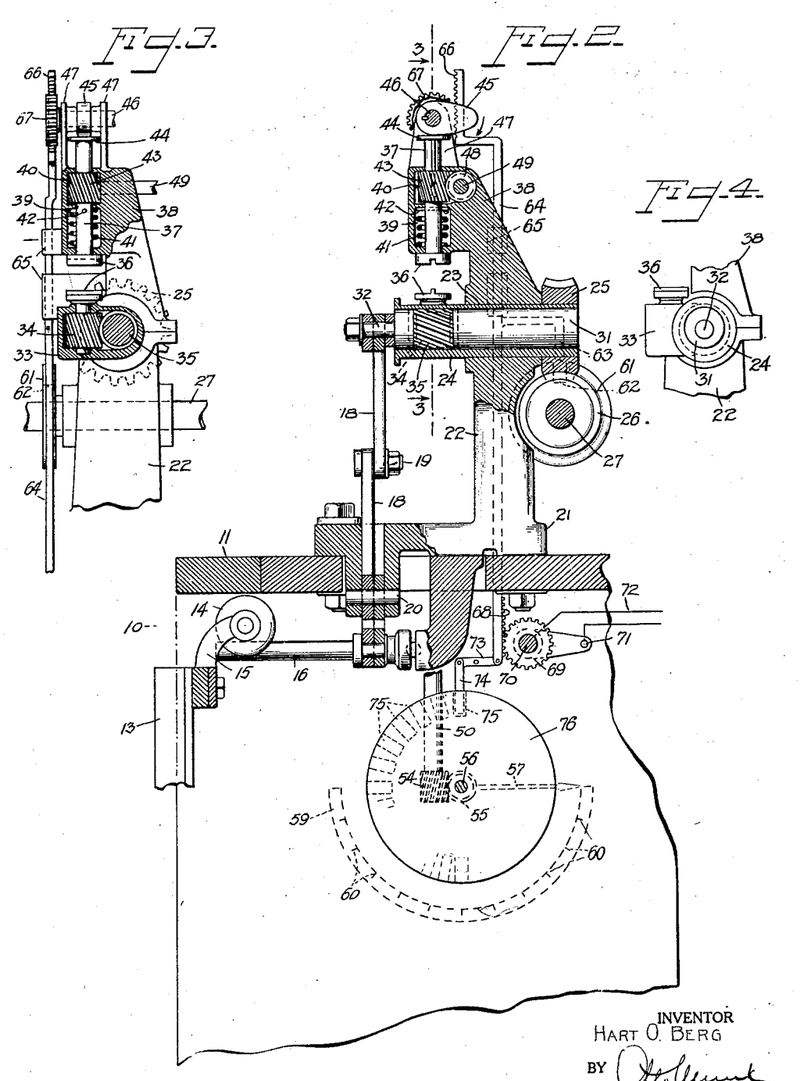
Figure 2 is a longitudinal sectional view taken on the lines 2—2 of Figure 1.
Figure 3 is a transverse sectional view of the same taken on the lines 3—3 of Figure 2.
Figure 4 is a front view of a supporting spindle and standard.

Rotation of shaft 46 is effected through its connection with an upright shaft 50 disposed at one side of the box 10 and projecting through the top wall 11 to a point well below the latter. Shafts 46 and 50 are provided at their adjacent ends with worms 51 and 52, respectively, which mesh and are supported in a hanger 53 having its base mounted on the wall 11. The lower end of shaft 50 inside of the box 10 carries a worm 54 in mesh with a worm 55 which is keyed to a dial shaft 56 projecting outwardly through the side wall 12 of the box, as illustrated in Figures 1 and 2. The outer end of the dial shaft 56 carries a radial pointer 57 and knurled thumb wheel 58. The pointer is adjustable over an arc shaped scale plate 59 having suitable graduations 60 corresponding to the different displacements required of the screen in operation.

Prior to adjustment of the dial shaft and connecting parts the tubular shaft 24, as previously stated must be locked in a certain position, preferably in a position which brings the shaft of the worm 34 in upright alinement. For the purpose of locking the parts in this position, a disc 61 is fixed on the power shaft 27 closely adjacent one of the columns 22 and provided with a notch 62 arranged to receive a bolt 63 of a locking rod 64, the latter comprising a long member guided in guideways 65 carried by the columns 22 and top wall 11 through which the rod projects. The upper end of the rod 64 is provided with a rack 66 in mesh with a toothed wheel 67 keyed to the cam shaft 46 so that simultaneously with the locking action of the bolt 63, the cam 45 will project the clutch member into engagement. The rod 64 at its lower end is also provided with a rack 68 which operates a gear 69 to rotate a shaft 70, the latter being adapted to carry a radial electrical contact arm 71 for the purpose of breaking the electric circuit 72 of the motor 29. The extreme lower end of the rod 64 is pivotally connected to one end of a centrally pivoted lever 73 having its opposite end supporting a pivoted bolt 74 projecting downwardly and arranged to engage in any one of a series of peripheral openings 75 in a disc 76, which is mounted on the dial shaft 56 between the side wall 12 and worm 55. The shaft 70 projects through the side wall 12 and carries a knurled thumb nut 77 for the purpose of operating the entire locking arrangement and cut off for the motor.

Figure 5:
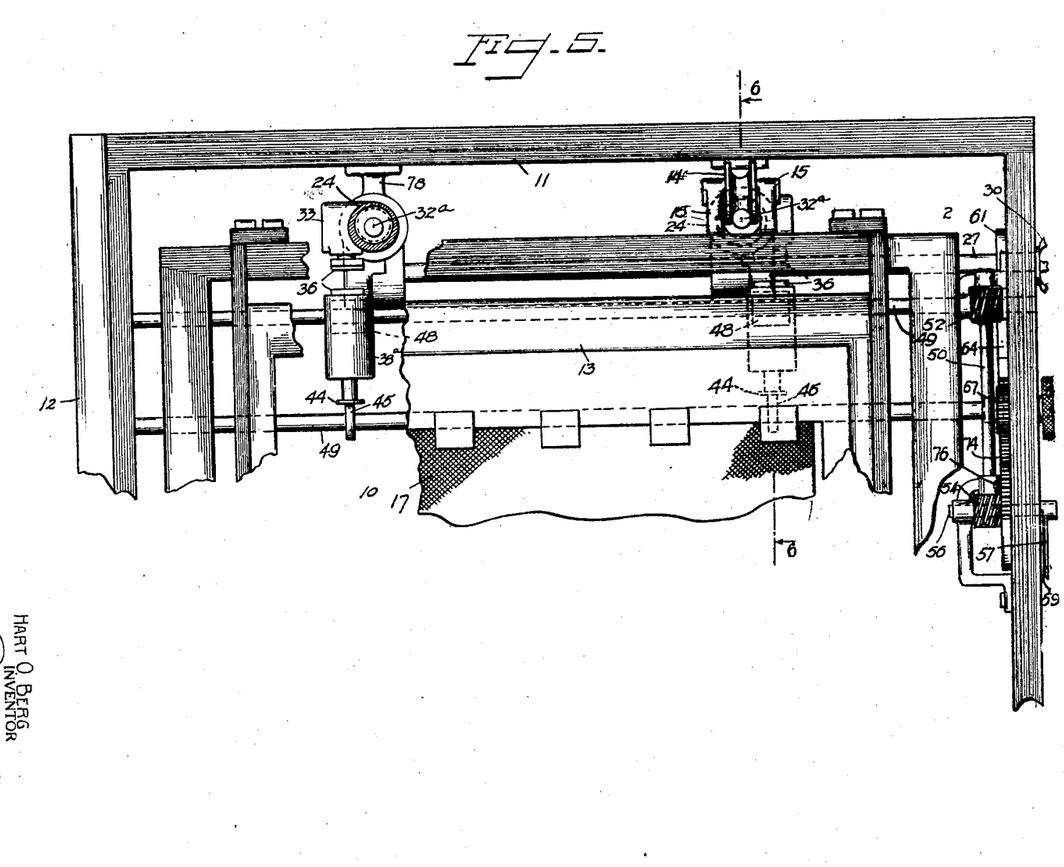
Figure 5 is a fragmental view similar to Figure 1 illustrating a modified embodiment of my invention in which the mechanism for shifting the screen is arranged and controlled by devices disposed within the screen box of the camera.
Figure 6:
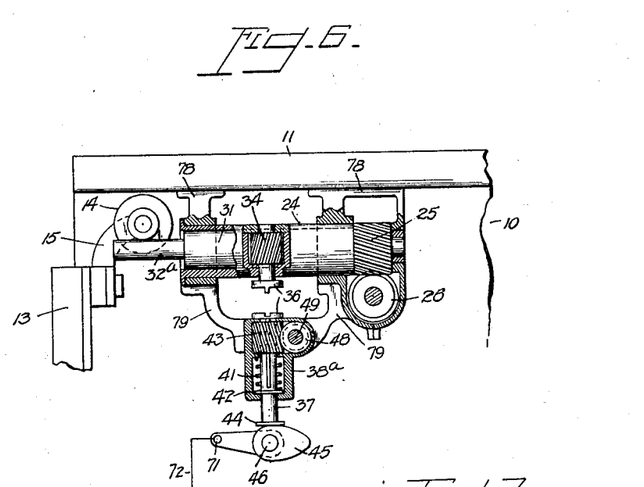
Figure 6 is a longitudinal sectional view taken on lines 6—6 of Figure 5.
Figure 7:
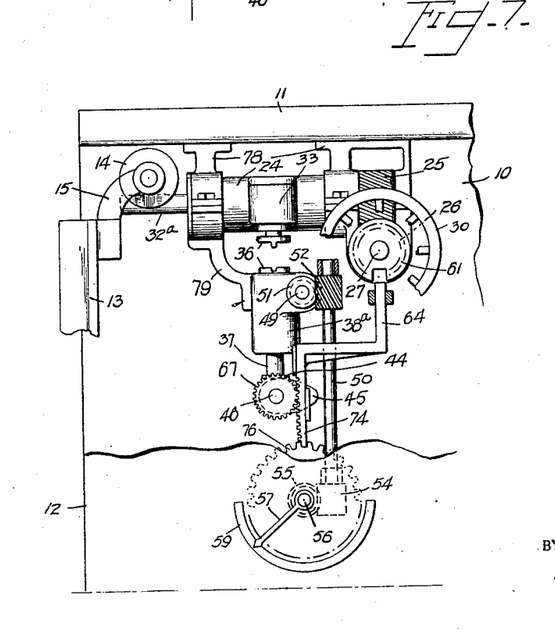
Figure 7 is a side elevational view of the modification shown in Figure 5.

Referring now to Figures 5, 6 and 7, it will be seen that all exteriorly disposed supporting elements have been eliminated or arranged within the box 10. According to this embodiment of my invention the castors 14 are supported directly upon the spindle $32^a$ projecting from the solid shaft 31 of the eccentric tubular shaft 24. Instead of the tubular shaft 24 being mounted on top of the top wall 11, it is suspended in hangers 78, so that the spindle $32^a$ in its movements coincides with those taken by the spindle 16 in the construction illustrated in Figures 1, 2, and 3. Since the space between the underside of the top wall 11 and the working space of the screen is very limited the solid shaft adjusting mechanism is disposed below the hangers 78 in which case the clutch members 36 are operated from underneath by a device comprising a casing $38^a$ enclosing shaft 37, spring 41 and worm gears 43 and 48. The casing $38^a$ is suspended from the hangers 78 by suitable brackets 79, as illustrated particularly in Figure 5. The control and setting members of the combination are substantially the same as already described with the exception of the locking attachment, which does not require the rocker lever 73 nor pivoted bolt 74, because the operation all takes place below the power shaft 27 and the actuating rod $64^a$ acts directly on both discs 61 and 76, as illustrated clearly in Figure 6.

Figure 8:
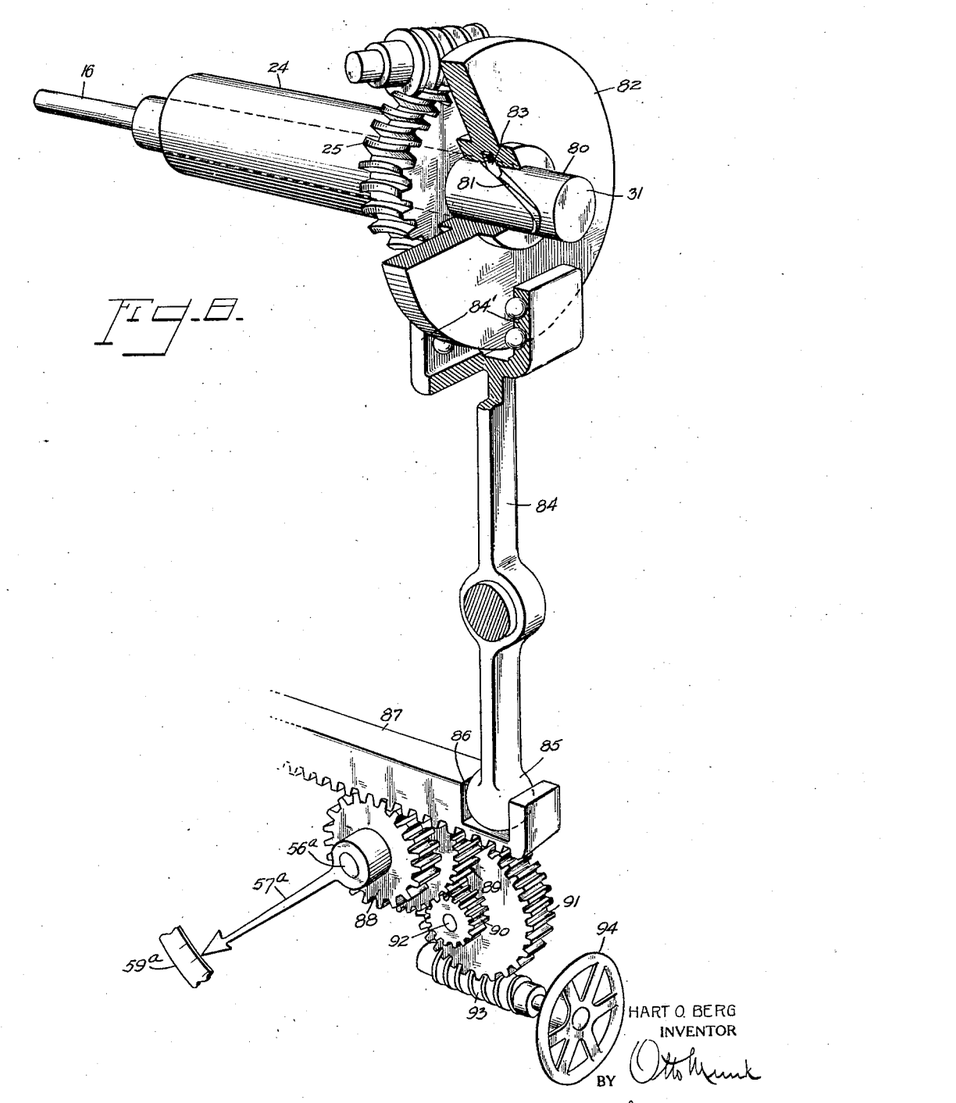
Figure 8 is a perspective elevational view of the controlling mechanism of an embodiment of my invention which enables the operator to change the amplitude of the path of movement of the screen during operation.

Referring now to Figure 8, I have illustrated an attachment for actuating the solid shaft 31, shown in any of the preceding figures, whereby the said shaft may be rotated within the tubular shaft 24 without bringing the moving parts to a halt, as required in the embodiments already described. I accomplished this step by projecting the solid shaft 31 rearwardly of the driving worm 25 to form a cylindrical surface 80 in which is cut a cam groove 81. A disc 82 loosely mounted on the cylinder 80 is provided with a radially projecting pin 83 engaged in the groove 81 and adapted to convert reciprocating movement of the disc into a rotary motion of the cylinder 80 and consequently the solid shaft 31 too. A disc 82 is utilized for this purpose because the latter must rotate with the solid shaft 31 when it revolves with the tubular shaft 24. As a consequence a segment of the disc 82 is always in a position which makes it possible to engage the same with a yoke 84', which is carried at the upper end of a rocker arm 84, the opposite end being provided with a ball portion 85. The reciprocating movement of the disc is very slight and the arms of the yoke 84' engage the disc closely adjacent its periphery so that in actual practice these parts will not bind together. The ball portion 85 is embraced by the walls of a socket 86 forming the end of a rack 87 adapted to be adjusted longitudinally thereof and substantially parallel with the axis of the tubular shaft 24. The distances of movement of the rack 87 necessary to rotate the solid shaft 31 for all amplitudes of movement of the screen are indicated on an arcuate dial 59ª and adapted to be the setting points for the pointer 57ª, the dial shaft 56ª in this case being provided with a toothed wheel 88 in mesh with the teeth of the rack 87 and a spur gear 89, which engages a pinion 90 carried by a worm wheel 91 on a stud shaft 92. The worm wheel 91 is rotated and the pointer 57ª set by a worm 93 and hand wheel 94. In operation, it will be clear that with the knowledge that the tubular shaft 24, solid shaft 31 and disc 82 are constantly in rotary motion, any tendency of the yoke to move one way or another will simply cause the solid shaft to rotate faster or slower than the tubular shaft and the relative change in speeds will result in the degree of excentricity one shaft will have with respect to the other.

Figures 9, 10:
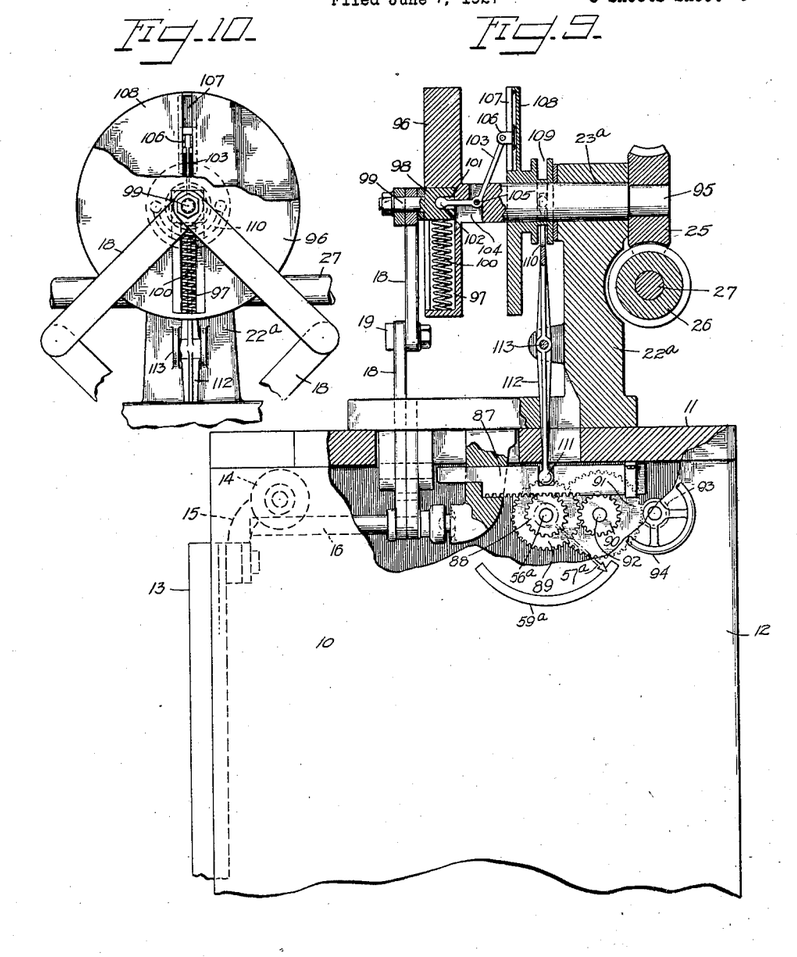
Figures 9 and 10 are a longitudinal sectional view and front elevational view, respectively, of a still further modification of my invention whereby the operator may make adjustment of the screen during operation thereof.

Referring now to Figures 9 and 10, I have illustrated a screen adjusting device embodying some features already included in the preceding figures, but combined in such a way that the adjustment of the relative position of the solid shaft supporting the pantograph system, or castor direct, may be effected during operation of the screen. In this embodiment, the screen supporting castors 14, spindle 16 and pantograph levers 18 are the same as illustrated in Figure 2, and the standard 22ª rises perpendicular to a base plate mounted on the top wall 11 of the screen box 10. A bearing 23ª is provided in the upper end of the standard 22ª to receive a rotary shaft 95, which corresponds to the tubular shaft 24 of the other constructions, and which is enlarged at its forward end to form a disc 96 having a radial slot or guideway 97. Slidably arranged in the guideway is a bearing block 98 from which a spindle 99 projects to receive the upper ends of the pantograph levers 18. The axis of the spindle 99 coincides with the axis of the shaft 95 when the spindle is in normal position, and the block 98 is yieldably supported towards the center of the disc 96 by a coiled spring 100 mounted in the guideway 97.

Some space is provided on shaft 95 between the disc end and the point where it enters the bearing 23ª and this space is utilized to receive a slide control for the bearing block 98. The block itself is provided with a bore 101 having its axis coincident with the axis of the spindle 99 and the inner end rounded to receive a ball portion 102 of a bell crank lever 103. The arm of the lever having the ball portion 102 and a portion of the other arm operate in a transverse slot 104 in the body of the shaft 95 just back of the disc 96. A pivot 105 for the bell crank lever 103 is arranged transversely of the slot 104. The outer portion of the other arm of the lever 103 projects radially of the shaft 95 and at its end it is pivotally connected to a slide block 106 which is guided in a radially disposed slot or guideway 107 in the face of a disc 108 loosely mounted on the shaft 95 between the lever and the bearing 23ª. In order to rock the bell crank lever 103 to cause the decentering of the spindle 99 the disc 108 is adjusted longitudinally of the shaft 95. Such movement is accomplished by a grooved collar 109 integral on the hub of the disc 108 and a yoke 110 embracing the under half of the groove, the yoke 110 being provided with ball ends 111 to engage between the walls of said groove. The yoke 110 projects from one end of a lever arm 112 pivoted midway thereof on a pin 113 carried between two wings on the standard 22ª. The lower end of the arm is provided with a ball 113 corresponding to the ball end 85 of the construction illustrated in Figure 7. The shifting action of the lever arm 112 is caused by a moving rack 87, gears and worm control in an arrangement already fully described.

Operations of any of the embodiments of my invention are substantially the same and I shall merely describe the operation of the controlling mechanisms in each case.

In Figures 1 to 4 and 5 to 7, the hand wheel 30 is turned until the notch 62 registers with the bolt 63. Nut 77 is then turned causing the bar 64 to drop thereby locking the drive shaft 27, disconnecting the electric motor circuit 72 and withdrawing the bolt 74 from the disc 76. Simultaneously with these operations the cams 45 are engaged against the shafts 37 which recede and cause the clutch members 36 to engage each other. The dial nut 58 is then rotated to bring the pointer 57 in position over the selected division 60, such movement being accompanied by a rotary movement of the dial shaft 56 and connections to the shaft 37, which causes the clutch 36 to rotate and with it the solid shaft 31. Since the tubular shaft 24 is locked against rotary movement by the bolt 63, the degree of movement of the solid shaft 31 in the eccentric bore of the fixed shaft will determine the amount of decentering of the axis of the spindle 32 with respect to the axis of the tubular shaft 24.

The use of the eccentrically arranged spindle and shaft 31 adjustably mounted in the tubular main shaft 24, insures the screen supporting elements against vibration during operation and the embodiments of the invention illustrated in Figures 8 to 10 make it possible to further adjust the spindles carrying the pantograph systems or screen during operation without the slightest vibration being present during the adjustment or operation of the screen. According to Figure 8 the shafts 31 are rotated in the eccentric bores of the main tubular shafts 24 by the grooved cylinder cam arrangement and in Figures 9 and 10 the spindles supporting the pantograph systems are decentered by reciprocating movement of a disc associated therewith. The degree of relative movement of the spindle shafts 31 or 99 to amplify or reduce the diameter of the circular path described by screen in operation is suitably indicated on the dial plates 59 and it is merely necessary to move the pointer to a certain graduation 60 to bring about the desired circular displacement of the grating about geometric centers of the transparent elements.

It will be clear that in accordance with the present invention both supporting systems for the screen are set, operated and controlled at one point on the machine, a condition not heretofore possible when each decentering device was adjusted separately.

Having now described the nature of my invention and its mode of operation what I desire to secure by Letters Patent is:—

1. In combination, a screen and a holder therefor, and screen adjusting mechanism comprising a rotary member, and means adjustable within said member and operatively connected with the holder for effecting circular displacement of the screen about the geometric centers of the transparent elements of the screen grating.

2. In combination, a screen and a holder therefor, and screen adjusting mechanism, comprising a rotary member, means adjustable within said member and operatively connected with the holder for effecting circular displacement of the screen about the geometric centers of the transparent elements of the screen grating, and means operating said adjustable means to modify the amplitude of the displacement.

3. In combination, a screen and a holder therefor, and screen adjusting mechanism for opposite ends of the holder, comprising eccentrically arranged revolving elements supporting the holder, and means operating simultaneously to adjust the eccentricity of both revolving elements for effecting circular displacement of any amplitude of the screen about the geometric centers of the transparent elements of the screen grating.

4. In combination, a screen and a holder therefor, screen adjusting mechanism operating to effect circular displacement of the screen about the geometric centers of the transparent elements of the screen grating, said mechanism comprising a tubular rotary shaft having an eccentrically disposed bore, a second shaft arranged in said bore and having a projecting spindle disposed eccentrically with respect to the axis of the second shaft, and means operating to connect the spindle and holder.

5. In combination, a screen and a holder therefor arranged within a camera, screen adjusting mechanism operating to effect circular displacement of the screen about the geometric centers of the transparent elements of the screen grating, comprising adjustable eccentric supporting means for the holder, and means operating to adjust the eccentricity of the supporting means to modify the amplitude of displacement.

6. In combination, a screen and a holder therefor arranged within a camera, and screen adjusting mechanism comprising rotary shafts carried by the camera and disposed adjacent opposite ends of the holder, each shaft having an eccentric bore, a second shaft rotatably mounted in said bore, and having a projecting portion eccentrically disposed with respect to the shaft itself, means carried by the first shaft and operating to revolve the second shaft within the first shaft to change the distance between the centers of the projecting portion and the first shaft, means operating to simultaneously operate the last named means of both rotary shafts, and means operating to simultaneously impart rotary movement to both rotary shafts.

7. In combination, a screen and a holder therefor arranged within a camera, and screen adjusting mechanism comprising a pantographic control made up of a system of levers operatively connected to said holder, a fixed bearing therefor, an eccentric operating to impart movement to said levers to cause the holder to move with the screen in circular paths in its own plane.

8. In combination, a screen and a holder therefor arranged within a camera, and a screen adjusting mechanism comprising pantographic connecting means for the holder, a rotary shaft having an eccentric bore, a shaft for the bore having a projecting portion offset with respect to the axis of the shaft itself and operatively connected with the pantographic means, means for revolving the second shaft within the first, and means operating to rotate the first shaft.

9. In combination, a screen and a holder therefor arranged within a camera, and a screen adjusting mechanism comprising spaced standards arranged in the camera over the opposite ends of the holder, shafts having eccentric bores carried by said standards, power means for simultaneously rotating the shafts, shafts arranged in said bores and having offset axial spindles operatively connected with the holder to move the screen in circular paths in its own plane, means carried by the first shafts and operatively associated with the second shafts to revolve the latter, and means controlled from the outside of the camera and adapted to be brought into operative connection with the first means for imparting movement thereto to modify the amplitude of displacement of the screen during rotation of the first shaft.

10. In combination, a screen and a holder therefor, and screen adjusting mechanism, comprising a rotary member, means adjustable radially of said rotary member and operatively connected with the holder, means slidably mounted on said rotary member and operating longitudinally thereof, and connecting means carried by the rotary member and operatively associated with the first and second named means for adjusting the first means relatively of the center of the rotary member and effecting circular displacement of the screen about the geometric centers of the transparent elements of the screen grating.

11. A screen operating mechanism, as claimed in claim 10, including means for shifting the first named means longitudinally of the rotary member, substantially as described.

12. A screen operating mechanism, as claimed in claim 10, in which the rotary member comprises a shaft having a radially slotted disc shaped end portion and a diametrically disposed slot disposed adjacent the disc portion and in communication with the slot of the latter, a rocker arm pivoted in the diametrically disposed slot, one end of said arm being arranged in the radially adjustable means which slides in the slot of said disc and the opposite end of the arm being carried by the longitudinally adjustable means, the latter comprising a disc having a radially disposed slot and means slidably arranged in the slot and pivotally connected to the end of the rocker arm whereby movement of the disc to or away from the first disc portion will rock the arm and adjust the first means to adjust the holder, substantially as described.

13. In combination, a screen and a holder therefor, and screen adjusting mechanism, comprising a rotary member for each end of the holder, having an eccentric bore, a driving connection common to each rotary member, a shaft arranged in each eccentric bore provided with an offset axial spindle operatively connected with the holder, said shaft further having a groove cam, means slidable longitudinally of the shaft and having a portion projecting into said groove, and a mechanism for shifting the last means to rotate the shaft independently of the rotary movement of the rotary member to change the effective center of the spindle with respect to the rotating center of the rotary member.

14. A screen operating mechanism, as claimed in claim 13, in which the last named means comprises a pivoted lever having a yoke at one end and a ball at the other end, the longitudinal sliding means comprising a disc embraced by the arms of the yoke, a rack remote from the screen and having a slot to receive the ball end of the lever, a pinion in mesh with the teeth of the rack, a train of gears for operating the pinion to shift the rack, and a worm setting device operating to rotate the gear train, substantially as described.

In testimony whereof I affix my signature.

HART O. BERG.